United States Patent [19]

Anderson

[11] 4,058,501
[45] Nov. 15, 1977

[54] POLYMER COMPOSITIONS
[75] Inventor: Arnold L. Anderson, Antioch, Ill.
[73] Assignee: Velsicol Chemical Corporation, Chicago, Ill.
[21] Appl. No.: 710,290
[22] Filed: July 30, 1976

Related U.S. Application Data

[63] Continuation-in-part of Ser. No. 330,779, Feb. 8, 1973, abandoned.

[51] Int. Cl.² .......................... C08K 5/06; C08K 3/22
[52] U.S. Cl. ................... 260/45.75 B; 260/45.95 G
[58] Field of Search .................. 260/45.95 G, 45.75 B

[56] References Cited
U.S. PATENT DOCUMENTS

| | | | |
|---|---|---|---|
| 3,385,819 | 5/1968 | Gouinlock | 260/45.75 R |
| 3,560,441 | 2/1971 | Schwarcz et al. | 260/45.7 R |
| 3,658,634 | 2/1972 | Yanagi et al. | 161/403 |
| 3,717,609 | 2/1973 | Kutner | 260/45.95 G |

Primary Examiner—V.P. Hoke
Attorney, Agent, or Firm—Robert M. Phipps

[57] ABSTRACT

Polymer compositions containing a three component system consisting of (1) an elastomer, (2) certain bisphenoxy compounds having the formula:

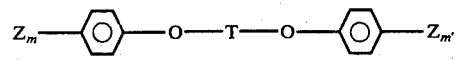

wherein Z is bromine, $m$ and $m'$ are each integers having a value of 1-5 with the proviso that the total bromine atom content is from 6-10, and "T" is a straight or branched chain carbon group having 1-4 carbon atoms, and (3) an enhancing agent hereinafter defined.

26 Claims, No Drawings

POLYMER COMPOSITIONS

RELATED PATENT APPLICATIONS

This application is a continuation-in-part of a copending application, Ser. No. 330,779, filed Feb. 8, 1973, now abandoned. The entire specification of Ser. No. 330,779, is to be considered as incorporated herein by reference.

PRIOR ART

The prior art considered in conjunction with the preparation of this application is as follows: U.S. Pat. Nos. 1,979,145; 2,130,990; 2,186,367; 2,263,444; 2,329,033; 2,488,499; 2,738,351; 2,797,246; 2,930,815; 3,384,819; 3,403,036; 3,549,591; 3,560,441; 3,649,591; 3,658,634; 3,666,692; 3,686,320; 3,697,456; 3,717,609; 3,763,243; 3,787,506; German Pat. No. 891,549; German Pat. No. 1,139,636; German Pat. No. 2,054,522; Japanese Pat. No. (72) 14,500 (and as cited in Volume 77, Chemical Abstracts, column 153737K, 1972); Chemical Abstracts, Volume 13, column 4485; Chemical Abstracts, Volume 31, column 70459; Chemical Abstracts, Volume 52 (1958), column 4543-4544; Journal of the Chemical Society, pages 2972-2976 (1963); Journal of the American Chemical Society, Volume 57 (1935), pages 572-574 and Volume 76 (1954), page 2993; Journal of the Science of Food and Agriculture, Volume 20 (1969), pages 748-754; Philippine Journal of Science, Volume 34 (1927), page 159; and Japanese Patent publication 033,456 of 1974. All of these publications are to be considered as incorporated herein by reference.

BACKGROUND OF THE INVENTION

The present invention relates to polymer compositions containing elastomers. More specifically, the present invention covers polymer compositions containing a three component system which consists of an elastomer, certain bis-phenoxy compounds (hereinafter defined) as flame retardants for said polymer compositions, and an enhancing agent (hereinafter defined) for said flame retardants.

Elastomers and utility thereof are known in the art as exemplified by *Textbook of Polymer Science*, F. W. Billmeyer, Jr., Second Edition, pages 533-550, John Wiley & Sons, Inc., New York, 1971 and *Encyclopedia of Chemical Technology*, Kirk-Othmer, Second Edition, Vol. 7, pages 676-716, John Wiley & Sons, Inc., New York, 1965 and which publications are in toto incorporated herein by reference.

The need for flame retarding elastomers has also been recognized in the art as exemplified by the two above-described publications and *Modern Plastics Encyclopedia* 1972-1973, Vol. 49: 10A, October, 1972, pages 456-458 and which publication is in toto incorporated herein by reference.

The prior art has specifically recognized the problems of finding suitable flame retardants for elastomers in view of the fact that polymer systems differ substantially in both flammability characteristics and physical properties and there is no predictability whatsoever from one system to another. Thus in the Norris et al paper entitled "Toxicological and Environmental Factors Involved in the Selection of Decabromodiphenyl Oxide as a Fire Retardant Chemical", Applied Polymer Symposium No. 22, 195-219 (1973), the authors state: "A growing recognition of the huge annual toll taken by fire is resulting in more stringent flammability requirements for synthetic polymers in a variety of applications. Because of economic constraints and the need to produce flame resistant polymers without total replacement of existing manufacturing processes, increased flame resistance is generally achieved by incorporation of a fire retardant chemical in the finished product. This chemical is usually based on bromine, chlorine, phosphorus, or nitrogen and may either be chemically reacted or physically blended into the product. Since polymer systems differ markedly in both flammability characteristics and physical properties, selection of a suitable flame retardant depends on a variety of factors that severely limits the number of acceptable materials.

"A general class of synthetic polymers that require flame retardancy because of their use in electrical and high temperature applications, but pose severe problems in selecting a suitable flame retardant are the high performance thermoplastic resins such as thermoplastic polyesters, polyphenylene oxides, and acrylonitrile-butadiene-styrene (ABS) terpolymers. Some of the most important criteria for an acceptable flame retardant in these applications are:

1. It must be as effective as possible to minimize both cost and effect on polymer properties. Use levels may range up to 15% by weight.

2. It must have sufficient stability to withstand conditions encountered during polymer processing and use. Processing conditions (blending, extrusion, and molding) often involve temperatures exceeding 300° C. The flame retardant must tolerate these conditions without degradation or volatilazation. Also, attention must be given to hydrolytic stability and oxidative degradation, particularly under extended service at high temperatures.

3. It must be compatible with the base polymer and exert minimal adverse effect on those properties that give the polymer its value. Some of these critical properties are tensile strength, impact strength, heat deflection temperature, shear strength, and flexural modulus.

4. Finally, the flame retardant must not interfere with attainment of desired product esthetics and form.

"Because of the stringent thermal stability requirements, only a very few compounds have been identified which can meet the necessary performance and economic criteria."

The resultant disadvantages in the utilization of various prior art materials as flame retardants, in general, for plastic compositions include, without limitation, factors such as thermal migration, heat instability, light instability, non-biodegradable, toxicity, discoloration, the large amounts employed in order to be effective, and the unpredictable end results obtained when using the same material in different plastics (note, for example, in Modern Plastics Encyclopedia, ibid, page 650, wherein octabromobiphenyl is suitable for use in polyolefins as a flame retardant therefor, but is not shown for use (or functionally equivalent) as such for the other 27 compositions listed such as ABS; polycarbonates, polystyrene, acrylics and polyurethanes). Thus, it can be seen that the field of flame retardancy is highly sophisticated and consequently requires substantial research effort to achieve a particular desired end result.

In conjunction with the rendition of elastomers flame retardant the aforegoing discussion is particularly applicable. Furthermore, it is important that, in addition to the retention of good physical characteristics, three characteristics (one of which is critical) of the product (elastomer) be within certain limitations in order to provide a functional flame retarded product. These three characteristics are (1) light stability (as measured, for example, by ΔE color values, hereinafter defined), (2) flame retardancy (as measured, for example, by UL-94, hereinafter defined, and which is a critical characteristic and limitation), (3) thermal stability (as measured, for example, by certain ASTM tests for decomposition and migration, hereinafter defined). This characteristic of flame retardancy is not an arbitrary item but is a criteria which is strictly adhered to in the elastomer art and hereinafter explained in more detail, with particular reference to the examples contained herein.

In conjunction with the foregoing discussion, the prior art in general suggests the use of halogen-containing materials as "potential" or "possible" flame retardants for plastic materials. However, the prior art also recognizes that any material must be adjudged on a case by case basis because of the unpredictable results of the end product when any additive is incorporated therein. For example, with reference to the use of a halogenated fire retardant in U.S. Pat. No. 3,658,634, attention is directed to the fact that the patentee specifically points out the disadvantages in the use of a halogen-containing fire retardant. In Column 1, lines 14–17, the patentee states: "Therefore, if it is possible to impart fire-retardancy to the thermoplastic polymers without deteriorating the useful properties of the thermoplastic polymers, they can be widely used in the field of inertia, construction and electric industries." In Column 1, lines 26–32, the patentee states: "—the compounds containing chlorine or bromine atoms to be used as fire-retardant agents, are generally sublimated and therefore, the fire retardant agents are sublimated and lost in the process for producing fire-retardant polymers or in after-finishing processes; accordingly, deteriorations of fire-retardancy or difficulties in use tend to occur more often than not."

In Column 1, lines 39–44 the patentee states: "—the compounds containing chlorine or bromine atoms to be used as fire-retardant agents are unstable in most cases when exposed to ultraviolet rays." In Column 1, lines 59–64 the patentee states: "However, as a matter of fact, only very few fire-retardant polymers can be used in actual practice although they are said to have fire-retardant effects, because there are restrictions such as the conditions employed in production attributable to the properties of the fire-retardant agent, or to the properties of the polymers into which they are to be incorporated."

It can be seen, then, from the foregoing discussion and quoted subject matter that the field of flame retardancy is highly sophisticated, unpredictable and requires substantial research to produce an end product (plastic composition) which meets the necessary criteria for utilitarian purposes, particularly under the present day government standards. Thus, there is always a demand for a material which will function as a flame retardant in elastomers and concurrently will not, by incorporation therein, adversely effect the chemical and/or physical and/or mechanical properties of the resultant elastomer containing polymer composition (herein also referred to as "elastomer polymer composition") and also have utility.

The prior art problem of providing a flame retarded elastomer composition having desired chemical, physical and mechanical properties, in addition to functional utility, has now been substantially solved by the present invention and the above-described disadvantages substantially overcome.

Accordingly, one of the main objects of the present invention is to provide elastomer polymer compositions which are flame retarded.

Another object of the present invention is to provide a unique three component system for elastomer polymer compositions which will not substantially adversely affect the chemical and/or physical and/or mechanical properties of said compositions.

A salient object of the present invention is to provide an elastomer polymer composition which has certain defined flame retardancy property.

A further object of the present invention is to provide a flame retardant and an enhancing agent which are economical and easy to incorporate into elastomers without being degraded or decomposed as a result of normal blending or processing operation.

BRIEF DESCRIPTION OF THE INVENTION

It has been found that the foregoing objects can be obtained by the use of a unique three component system which consists of (a) an elastomer (hereinafter defined), (b) certain bis-phenoxy compounds (hereinafter defined), and (c) an enhancing agent (hereinafter defined) to subsequently provide flame retarded polymer compositions which exhibit outstanding chemical, physical and mechanical properties.

It is to be understood that the term "flame retarded" as used herein refers and is restricted to a limited definition and that is the reduction in flammability of the polymer composition which contains the three component system. The criticality of this flame retardancy is more specifically set forth herein, with particular reference being made to page 19 herein regarding UL 94 classification (sometimes referred to herein as "values").

DETAILED DESCRIPTION OF THE INVENTION

The particular class of bis-phenoxy compounds used in the present invention compositions have the formula

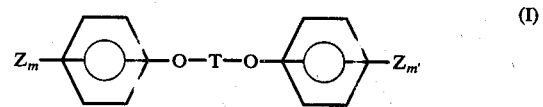

In Formula I above, Z is bromine, $m$ and $m'$ are each an integer having a value of 1 to 5 inclusive with the proviso that the total bromine content of said compound is six (6) to ten (10) bromine atoms inclusive, and T is (1) a straight chain carbon group having from one to four carbon atoms and includes, without limitation, groups such as —CH$_2$—; —(CH$_2$)$_2$—; —(CH$_2$)$_3$—; and —(CH$_2$)$_4$—; and (2) a branched chain carbon group having from two to four carbon atoms and includes, without limitation, groups such as follows:

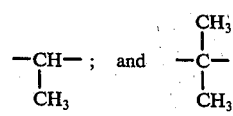

It is to be understood that all the compounds falling within Formula I above and as heretofore defined are generically described herein as "bis-phenoxy" compounds.

Representative, but without limitation, of said bis-phenoxy compounds are the following:

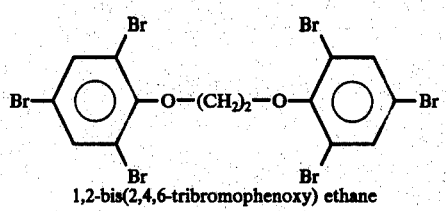
1,2-bis(2,4,6-tribromophenoxy) ethane (II)

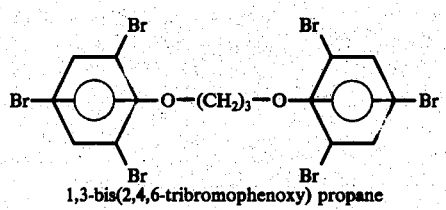
1,3-bis(2,4,6-tribromophenoxy) propane (III)

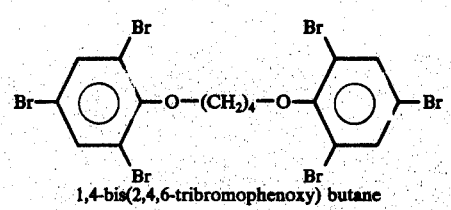
1,4-bis(2,4,6-tribromophenoxy) butane (IV)

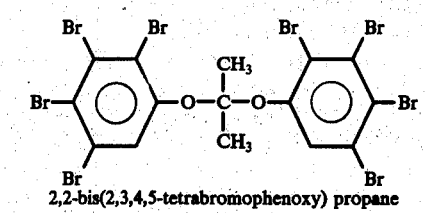
2,2-bis(2,3,4,5-tetrabromophenoxy) propane (V)

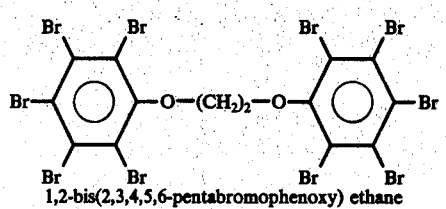
1,2-bis(2,3,4,5,6-pentabromophenoxy) ethane (VI)

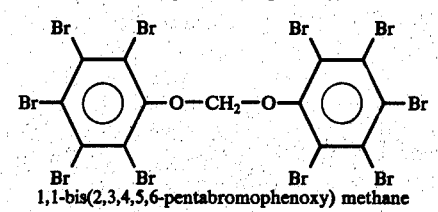
1,1-bis(2,3,4,5,6-pentabromophenoxy) methane (VII)

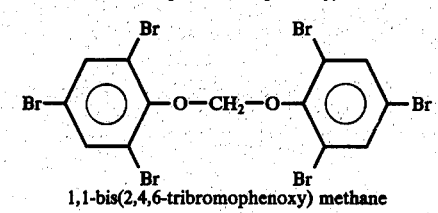
1,1-bis(2,4,6-tribromophenoxy) methane (VIII)

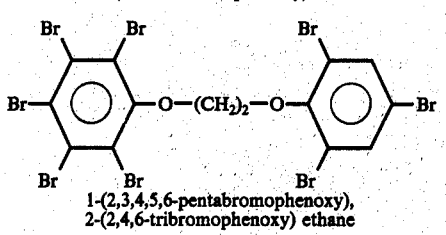
1-(2,3,4,5,6-pentabromophenoxy), 2-(2,4,6-tribromophenoxy) ethane (IX)

In general, the bis-phenoxy compounds are prepared by reacting a halogenated phenol with a halogenated alkane at elevated temperatures in the presence of a basic material such as alkali metal hydroxides, carbonates, bicarbonates, oxides and hydrides. The preferred alkali metals are potassium and sodium. Where one desires to increase, for example, ease of handling the reaction mass, solvents such as ketones (e.g. acetone, methyl ethyl ketone, and methyl iso-butyl ketone), alcohols (e.g. methanol, ethanol, iso-propyl alcohol, butyl alcohol and glycols), or aqueous solvents (e.g. water, a mixture of water and alcohol and a mixture of water and ketone) can be employed. the desired end product i.e. the bis-phenoxy compound, can be recovered from the reaction mass via various methods known to those skilled in the art. Where the end product requires recovery via crystallization, various aromatic solvents, such as benzene, toluene, xylene, dichlorobenzene and the like, can be used.

Specifically, the bis-phenoxy compounds are prepared according to the following reactions:

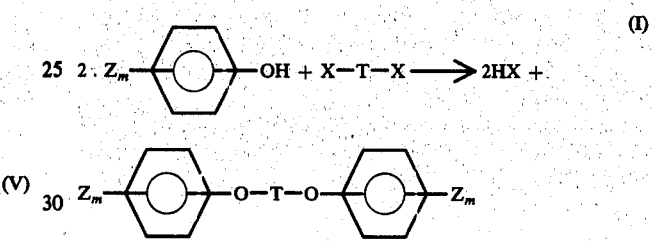

In the above reaction, X is halogen, preferably bromine, and T is the same as herein defined.

The above reaction is conducted at temperatures ranging from the freezing point of the initial reaction mass to the boiling point hereof. Preferably the temperatures are from about 40° C to about 200° C and more preferably from about 50° C to about 175° C. It is to be understood that the reaction can be conducted under sub-atmospheric (e.g. 1/10-8/10 atmospheres) pressure. Preferably, the reaction is carried out at atmospheric pressure.

The above-described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in preparing the bis-phenoxy examples set forth herein.

The amount of bis-phenoxy compound employed in the present invention compositions is any quantity which will effectively render, in conjunction with the enhancing agent, the elastomer composition flame retardant. In general, the amount used is from about 1% to 25% by weight, based on the total weight of the composition. Preferably, the amount employed is from about 1% to about 20% by weight. It is to be understood that any amount can be used as long as it does not substantially adversely effect the chemical and/or physical and/or mechanical properties of the end polymer composition. The amount utilized, however, is such amount which achieves the objectives described herein.

The second component of the three component system, and which is critical therefor, are certain compounds which when used with the bis-phenoxy compounds promote a cooperative effect therebetween and thus enhance the flame retardancy of the resultant polymer composition as compared to the flame retardancy of either one component used separately. These "enhancing agents" comprise the oxides and halides of groups IVA and VA of the Periodic Table, i.e. oxides and halides of antimony, bismuth, arsenic, tin, lead, germanium, e.g. antimony oxychloride, antimony chloride, antimony oxide, stannic oxide, stannic chloride, arsenous oxide, arsenous chloride, and the like; and organic and inorganic compounds of phosphorus, nitrogen, boron, and sulfur, e.g., triphenyl phosphate, ammonium phosphate, zinc borate, thiourea, urea, stannic sulfide, and the like and oxides and halides of titanium, vanadium, chromium, manganese, iron, niobium, molybdenum, copper, zinc, magnesium, e.g., titanium dioxide, titanium chloride, vandanium pentoxide, chromic bromide, manganous oxide, molybdenum trioxide, ammonium molybdate; and hydrates of the above, e.g., stannic oxide hydrate, lead hydrate; and combinations thereof. The preferred enhancing agents are the oxides of antimony, arsenic and bismuth. However, any compound which on decomposition, as by ignition, yields these oxides would be suitable. Thus some organic antimonates are preferred. The enhancing agents disclosed in U.S. Pat. No. 3,205,196 are also suitable for use.

U.S. Patent 3,205,196, column 2, states that "Antimony oxide is the antimony compound that is presently preferred for use in the present invention. However, many antimony compounds are suitable, inorganic antimony compounds include antimony sulfide sodium antimonite, potassium antimonite, and the like. Many organic antimony compounds are suitable such as the antimony salts of organic acids and their pentavalent derivatives disclosed in U.S. Pat. No. 2,996,528. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise the esters of antimonous acids and their pentavalent derivatives disclosed in U.S. Pat. No. 2,993,924, such as tris(n-octyl) antimonite, tris(2-ethylhexyl) antimonite, tribenzyl antimonite, tris ($\beta$-chloroethyl) antimonite, tris($\beta$-chloropropyl) antimonite, tris($\beta$-chlorobutyl) antimonite and their pentavalent compounds are the cyclic antimonites such as trimethylolpropane antimonite, pentaerythritol antimonite, and glycerol antimonite. The corresponding arsenic and bismuth compounds can also be employed."

It is to be understood that such patents as U.S. Pat. Nos. 3,205,196; 2,996,528 and 2,993,924 are to be considered as incorporated herein by reference for all intents and purposes. Without limitation, preferred enhancing agents include $Sb_2O_3$, $SbCl_3$, $SbBr_3$, $SbI_3$, $SbOCl$, $As_2O_3$, $As_2O_5$, $ZnBO_4$, $BaB_2O_4 \cdot H_2O, 2.ZnO.3B_2O_3$, $3.5H_2O$ and stannic oxide hydrate. The more preferred enhancing agent is antimony trioxide.

The amount of enhancing agent employed in the present invention compositions is any amount which when used with said bis-phenoxy compounds will promote a cooperative effect therebetween. In general, the amount employed is from about 0.5% to about 15%, preferably from about 0.5% to about 10%, by weight, based on the total weight of plastic composition. Higher or lower amounts can be used as long as the desired end result is achieved.

The third critical component of the three component system is the elastomer polymeric composition. It is to be understood that the term elastomers as used herein means a material which can be vulcanized or similarly processed into a substance that at room temperature (approximately 68° F) stretches under low stress to at lease twice its length and snaps back to the original length upon release of stress. This includes, without limitation, materials such as natural rubber, butadiene polymers, 2-chlorobutadiene polymers, isoprene polymers, silicone rubber, chlorosulfonated polyethylene, and polyethers. (It is to be understood that this term elastomer includes, without limitation, that definition of elastomer as set forth in the June, 1976 United States International Trade Commission (USITC), Preliminary report, entitled Synthetic Organic Chemicals, United States Production and Sales of ELASTOMERS - 1975, USITC, Wash. D.C. 20436 and which publication is to be considered as incorporated herein by reference).

Thus the elastomer used in the present invention compositions is any elastomer herein defined and which one so desires to flame retard. It is to be understood that the elastomer used can be a "virgin" material, i.e. substantially free of additives such as stabilizers, plasticizers, dyes, pigments, fillers, and the like, or the elastomer can have additives (such as those mentioned and described herein) already contained therein or added concurrently with or after the addition of the bis-phenoxy compounds and enhancing agents.

The bis-phenoxy compounds and enhancing agents can be incorporated into the elastomer at any processing stage in order to prepare the present invention plastic compositions. In general, this is undertaken prior to fabrication either by physical blending or during the process of forming elastomer per se. Where one so desires, the bis-phenoxy compounds and/or enhancing agents may be micronized into finely divided particles prior to incorporation into the elastomer.

It is also within the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on Pages 456–458, Modern Plastics Encyclopedia, ibid., (in addition to the new class of flame retardants described herein); heat stabilizers; light stabilizers; pigments; plasticizers; preservatives; ultraviolet stabilizers and fillers.

In this latter category, i.e. fillers, there can be mentioned without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); comminuted polymers, e.g. reclaimed rubber; silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including filler, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero (0) percent, based on the total weight of the composition, up to that percent at which the composition can still be classified as a polymer. In general, such amount will be from about 0% to 75% and more specifically from about 1% to about 50%.

With reference to the present invention polymer composition described herein, one of the critical features thereof is the unusually high flame retardancy thereof. The significance of flame retardancy of polymer compositions is well recognized in the art as heretofore mentioned. However, recent developments in conjunction with the use of flame retardant polymer compositions as judged by the Consumer Product Safety Commission, require a UL-94 value (hereinafter discussed) of V-0 in order to produce a commercially acceptable article of manufacture. The Consumer Product Safety Commission is continuing to set mandatory standards in the field where the polymer compositions are utilized and since about 1970 have increased the criticality of the UL value of polymer compositions. In reacting to the Consumer Product Safety Commission's mandatory standards in this area, the producers of (polymer composition) articles of manufacture are now requiring that said articles have a V-0 value in order to meet new mandatory standards which are anticipated to be activated by federal legislature shortly. Thus, the significance of a plastic compositions having a V-0 value is well recognized in the art; note MODERN PLASTICS, September, 1974, pages 74–77, December, 1974, page 20, and December, 1975, pages 42–44, 48–50 and 59, and which publications are to be considered as incorporated herein by reference.

In conjunction with the present invention polymer compositions described herein, an important feature thereof is the light stability thereof. The significance of light stability of plastic compositions is recognized in the art, e.g. the publication entitled "The Measurement of Appearance" by Mr. Richard S. Hunter (Hunter Associates Laboratory, Inc., 9529 Lee Highway, Fairfax, Va.) 1973. Mr. Hunter has been associated with the efforts of defining appearance and color since the 1930's and was for many years an associate of Gardner who is another authority in this field. The following paragraphs from Mr. Hunter's book are set forth in order to demonstrate this light stability significance.

The Judd-Hunter system "of scales for color difference was based on Judd's uniform chromaticity scales triangle. Judd made an instrumental study of a number of woolen swatches rated by dyers for their acceptability as commercial color matches to standard. The NBS unit of color difference was designed by Judd to be the maximum difference commercially acceptable in the textile trade as represented by these dyers at the time when the study was carried out (Judd, 1939). The NBS Unit generally referred to today is not Judd's 1939 unit, but the Hunter 1942 version of the Judd unit with 100 units falling between black and white."

"Since 1942 this unit has been used in terms of a number of the opponent color scales. In a color scale which is already uniform in its visual spacing of lightness and chromaticity, and which has 100 units between black and white as well as rectangular coordinates for chromaticity, color difference in approximate NBS units can be specified in units of that system. The color difference becomes the distance between the two colors in that color space. With rectangular coordinates, the formula is:

$$\Delta E = \sqrt{\Delta L^2 + \Delta a^2 + \Delta b^2}$$

Similarly if only the chromaticity component of difference is desired, the formula is:

$$\Delta C = \sqrt{\Delta a^2 + \Delta b^2}$$

"Following Judd's proposed unit of color difference, Hunter proposed the measurement of much the same quantity by a photoelectric tristimulus method in 1942. In the next year, Scofield proposed a quantity which was quite a bit easier to compute. Scofield used the reciprocal of the square root of reflectance instead of the reciprocal of the fourth root of reflectance as a multiplier in adjusting reflectance values for uniform lightness scale intervals. This is the only difference between the Scofield and the Judd-Hunter formulas for color difference (Scofield, 1943)."

"In 1948, Hunter started to develop a tristimulus instrument which would read chromaticity dimensions of opponent colors directly. He was seeking to improve the precision and usefulness of results of the tristimulus reflectometers previously used. The $R_d$ scales developed in the period 1948 and 1950 did not have a uniform lightness readout but did have direct reading visually uniform a and b scales. The L scales, in which there is approximate perceptual uniformity in all three dimensions, were created in the period 1950–1952 but were not described in a formal publication until 1958. These two sets of Hunter Color Difference Meter scales enjoy wide use because of the fact that they can be read directly from a tristimulus instrument with high precision, and offer instrumental computation of color difference by the $\Delta E$ formula given above."

"NBS Unit of Color Difference is defined as: the unit of color difference of the National Bureau of Standards. The unit is about four times as great as the smallest difference observable under ideal conditions. Differences of less than one unit are usually not important in commercial transaction. In Munsell terms, one NBS unit is equivalent to about 0.1 Value step, 0.15 Chroma step, or 2.5 Hue step at Chroma 1."

"Hunter further investigated the use of L', $\alpha'$, $\beta'$ for color difference measurement. He recognized at this time (which no other color-dfference scale before or since has recognized) that perceived color difference will depend on the proximity of the specimens compared and on their glossiness. Accordingly, the 1942 Hunter color difference equation includes factors to account for these variables. It is this equation, with selected constants, that defines the widely used NBS unit of color difference."

"High precision is almost always essential for useful color difference measurements. Only with precise instruments is it possible to measure color differences as small as those the eye can see. Instrument accuracy is also normally a requisite because spectrally inaccurate instruments, even though precise, will give visually inaccurate color difference measurements wherever there are spectral differences between the specimens involved. The ease of obtaining and interpreting values of color difference is another factor which may affect the selection of a procedure."

"Twenty years ago, color difference scales were in demand to serve as a basis for setting one-number tolerances for fading and acceptability of matches. The Index of Fading and NBS unit were used as units."

"Today, the concept of color difference is more refined. One number tolerances are seldom used. Instead, color difference tolerances are designed as boundaries in color space within which acceptable colors must fall. The boundaries do not necessarily correlate with perceptibility of difference but rather with the limits of acceptability. The standard color, furthermore, may not be in the center of the bounded region but may be displaced to one side. For example, where subsequent yellowing may occur, the tolerance for the yellow-blue dimension might be +0.1, −0.8 units."

"Color difference specifications are tighter today and tolerances are smaller. The specification usually treats the color dimensions separately so that a complete specification would contain nine members: The three numbers that describe the desired color, and the six numbers that describe the individual plus and minus tolerances. Such tolerances can be reduced to graphs which not only show acceptability but provide a guide to the formulation correction needed to correct an off shade. When the question of acceptability becomes a question of sorting objects according to shade, a graphical chart showing the classification of color values can be quite helpful."

"Although color measurements are frequently used for identification, sorting and recording of color values, the primary uses of tristimulus instruments all involve measurements of fairly small color differences. The most frequent uses of these small color difference measurements are to establish closeness to standard and to give guidance for the adjustment of color mismatches. They are also used in the study of deterioration in a product as a result of exposure and use."

"Spectrophotometers and tristimulus instruments made up the majority of color appearance measuring instruments in use in industry. Spectrophotometers give wavelength-by-wavelength analyses of the reflecting properties of objects, while tristimulus instruments by the use of filters which approximate the Standard Observer functions of the eye, give measurements of color in X, Y, Z terms, or in L, a, b values. Spectrophotometers are essential where color formulation is involved, and metamerism must be controlled. However, tristimuls colorimeters and reflectometers provide precise and less expensive means for the routine measurement of color and adjustment of small color differences."

In view of the foregoing quoted subject matter, it can thus be seen that a change in $\Delta E$ value of 1 unit constitutes a real change. Note also Japanese patent application (publication 022,456 of 1974) which shows that achieving a color change in $\Delta E$ of only 2.3 is significant as it pertains to a polycarbonate polymeric composition; (this value is substantially the same as those $\Delta E$ values obtained in polycarbonate tests and which results thereof are shown in Table X herein, i.e. 2.3 versus 2.5 over the control). Both of these publications (i.e. the Japanese patent 022,456 and the Hunter book) are to be considered as incorporated herein by reference. It is to be noted also that a lower $\Delta E$ value is more desired and the higher $\Delta E$ value is least desired. This $\Delta E$ value is not an abstract value, however, since one must compare it with the $\Delta E$ values of the "control" polymer composition. One of the desired $\Delta E$ values would be where both the $\Delta E$ values of the "control" polymer composition (without additives-i.e. without flame retardant and enhancing agent) and the polymer compositions with said additives are substantially the same or the latter has a lower value.

EXAMPLE I

An elastomer polymer material, a compound ethylene propylene diene monomer (EPDM) rubber (prepared by mixing together 100 parts Uniroyal's Royalene 512-EPDM rubber, 50 parts carbon black, 15 parts naphthenic oil, 5 parts zinc oxide, 1 part stearic acid, 0.5 parts 2-mercaptobenzothiazole, 1.5 parts tetramethylthiuram monosulfide and 1.5 parts sulfur) is utilized as the base resin in order to prepare 7 formulations (polymer compositions). With the exception of formulation No. 1, the particular bis-phenoxy compound (and the antimony trioxide enhancing agent where indicated) is incorporated ino the polymer by adding both to a Brabender mixer ("Plastic-Corder", Torque Rheometer, Model PLV-150, C. W. Braebender Instruments Inc., South Hackensack, N.J.). This mixer is equipped with a pair of roller type blades positioned within a head provided with heat transfer means.

The resultant mixture is heated to about 320° C.; at this temperature, it is in a molten state. The percentages by weight of each component utilized in the respective formulations are listed in Table I. Each formulation is discharged from the mixer and upon cooling solidifies and is ground into chips. The chips are subjected to compression molding in a Wabash press by placing said chips between two platens, the bottom of which contains four equal size depressions three inches by five inches by one-eighth inch deep. The top platen is then placed over the bottom platen and heat transfer means suppled thereto in order to melt said chips and thus provide solid samples (after cooling) for testing.

Portions of the solid samples of each respective formulation (Nos. 1–7) prepared according to the above described procedure are then subjected to two different standard flammability tests, i.e. UL 94 and ASTM D-2863-70. The UL 94 is, in general, the application of a burner to a test specimen (strip) for a certain period of time and observation of combustion, burning, and extinguishment. This procedure is fully set forth in Underwriters" Laboratories bulletin entitled UL 94, Standard for Safety, First Edition, September 1972 and which is incorporated herein by reference. ASTM No. D-2863-70 is a flammability test which correlates the flammability of a plastic specimen to the available oxygen in its immediate environment; this correlation is stated as an Oxygen Index, O.I., level predicated upon the percent oxygen in the gaseous medium which is required to just provide a steady state of continuous burning of the polymer specimen. This ASTM method is fully described in 1971 Annual Book of ASTM Standards — Part 27, published by the American Society for Testing and Materials, 1916 Race Street, Philadelphia, Pa.; this publication is to be considered as incorporated (in toto) herein by reference. The UL 94 test is the more critical test as it is the test generally used to determine the suitability of thermoplastics for commercial applications.

The results of these flammability tests are shown in Table I.

TABLE I

FLAMMABILITY DATA FOR ELASTOMER POLYMER COMPOSITIONS
CONTAINING BIS-PHENOXY COMPOUNDS WITH AND WITHOUT ENHANCING AGENTS

| Formulation No. | Bis-phenoxy Formula | Compound % | Enhancing Agent $Sb_2O_3$ % | Oxygen Index % | UL 94 |
|---|---|---|---|---|---|
| 1. | — | 0 | 0 | 20.5 | SB |
| 2. | III | 12.2 | 0 | 26.0 | SE-1 |
| 3. | III | 12.2 | 4 | 27.5 | SE-0 |
| 4. | III | 12.2 | 8 | 28.5 | SE-0 |
| 5. | II | 12.2 | 0 | 25.0 | SE-1 |
| 6. | II | 12.2 | 4 | 27.0 | SE-0 |
| 7. | II | 12.2 | 8 | 28.0 | SE-0 |

Referring to Table I, the bis-phenoxy compound formula II or III relates to the structural formulae heretofor set forth; and the UL 94 values are on a graduated scale wherein the highest degree to lowest degree of flame retardancy is respectively SE-0, SE-1, SE-2, SB and Burns.

The results shown in Table I demonstrate the unique effectiveness of the polymer composition containing an elastomer, the bis-phenoxy compound and the enhancing agent. Specifically, formulation No. 1 (the control) had a O.I. of 20.5 and UL 94 value of SB. Nos. 2 and 5 show only the use of the particular bis-phenoxy compound without an enhancing agent and both had a UL 94 value of SE-1. Thus it can be seen that without an enhancing agent, the critical SE-0 was not obtained.

The use of the three component system, i.e. elastomer, bis-phenoxy compound and enhancing agent, is fully demonstrated via the results obtained from testing formulations Nos. 3, 4, 6, and 7. Thus, the use of an enhancing agent such as $Sb_2O_3$ to promote a cooperative effect between such agent and the bis-phenoxy compound is quite apparent particularly when viewing the results obtained from testing formulation Nos. 1, 2 and 5. The highest UL 94 ratings are obtained in all cases with the three component system.

EXAMPLE II

Portions of the solid samples of Formulation Nos. 1-5 and 7 prepared according to the above described procedure of Example I are subjected to the following ASTM tests in order to ascertain other properties of the resultant polymer composition:
1. Tensile Strength (at break):   ASTM Test No. D638-61T; and
2. Flexural Strength:   ASTM Test No. D790-63;

Each of the aforementioned ASTM Tests are standard tests in the art and are utilized collectively in order to ascertain the efficacy of a polymeric system as an overall flame retarded composition for commercial application. All of these ASTM Tests are to be considered as incorporated herein by reference.

The results of these ASTM tests show that the physical properties of the present invention compositions are basically the same (except O.I. and UL 94 values) as the polymer material without the flame retardant (i.e. formulation No. 1). Thus, there is no substantial adverse effect on the physical properties of the polymer material when the bis-phenoxy compounds and enhancing agents are incorporated therein. The results of these ASTM tests are shown in Table II.

TABLE II

Properties of Elastomer Polymer Compositions Containing Various Additives

| Formulation | Tensile Strength psi | Flexural Modulus psi | O.I. % | UL 94 |
|---|---|---|---|---|
| 1) No. 1 (control) | 3000 | 1250 | 20.5 | SB |
| 2) No. 2 | 2700 | 1050 | 26.0 | SE-1 |
| 3) No. 3 | 2550 | 950 | 27.5 | SE-0 |
| 4) No. 4 | 2400 | 925 | 28.5 | SE-0 |
| 5) No. 5 | 2650 | 1100 | 25.0 | SE-1 |
| 6) No. 7 | 2400 | 1050 | 28.0 | SE-0 |

Referring to Table II, it is readily demonstrated that the physical properties of the present invention composition (e.g. formulation Nos. 3, 4 and 7) are basically the same (except O.I. and UL 94 values) as the elastomer material without the bis-phenoxy compound (i.e. formulation No. 1). In view of the results set forth in Table II, it can be seen then that no adverse effect on physical properties via such use of the bisphenoxy is realized.

Thus, the uniqueness and superiority of the present invention compositions is quite apparent.

EXAMPLE III

The procedure of Examples I and II are repeated except that the bis-phenoxy compound used corresponds to Formula IV, heretofor set forth, instead of Formulae II and III. Substantially the same results are obtained using the Formula IV compound as those obtained using Formulae II and III compounds.

EXAMPLE IV

The procedure of Examples I, II and III are repeated except that the enhancing agent used is zinc borate instead of $Sb_2O_3$. Substantially the same results are obtained using zinc borate as those obtained using $Sb_2O_3$.

EXAMPLE V

Strip samples of each of formulations Nos. 1 (control), 2, 3, 4, 5 and 7, Table I, are subjected to light stability tests via the use of a "Weather-Ometer", model 25/18 W.R., Atlas Electrical Devices Company, Chicago, Illinois. Utilizing an operating temperature of 145° F and a 50% relative humidity, each strip is subjected to 200 hours of "simulated daylight" via the use of carbon arc. The results show that after 200 hours, there is no significant discoloration in any strip tested and which demonstrates that the present invention compositions are highly resistant to deterioration by light.

EXAMPLE VI

Samples of each of formulation Nos. 1 (control), 2, 3, 4, 5 and 7, Table I, are subjected to temperature (thermal) stability tests via the use of thermal gravimetric analysis (TGA). This test employed the use of a "Thermal Balance", model TGS-1, Perkin-Elmer Corporation, Norwalk, Connecticut, and an electrical balance, Cahn 2580 model, Cohn Instrument Company, Paramount, California. The results of these tests show that the bis-phenoxy compound containing formulations had more than adequate stability for melt processing and subsequent heat aging (i.e. high temperature applications) and thus demonstrating that the particular bis-phenoxy compounds are quite compatible with the elastomer material. The bis-phenoxy compound stability thus aids in providing sufficient flame retardancy at the elastomer decomposition temperature. This test also demonstrates that the bis-phenoxy compounds do not exhibit migration.

COMPARATIVE EXAMPLES

The following examples are presented to demonstrate the unpredictability of plastic compositions, via the end results, containing the same bis-phenoxy compounds, with or without an enhancing agent.

Referring more specifically to the following examples, Example VII compares a three component system, i.e. ABS, certain "bis-phenoxy compounds" (herein referred to as BPC), and enhancing agent with four other polymers containing the same bis-phenoxy compounds (as used in the present invention) and enhancing agent. The four comparative polymers are polyacrylonitrile, polypropylene, nylon and polymethylmethacrylate. As will be seen from the results hereinafter set forth, the four other polymers had no flame retardant efficacy when incorporating the bis-phenoxy compounds and enhancing agents, whereas the ABS system did and so demonstrated an unexpected and substantial flame retardant efficacy. These results, thus, are another indication of the unpredictability of additives when incorporated into polymer systems and correspond to the subject matter set forth in "Modern Plastic Encyclopedia", ibid., regarding the use of octabromobiphenyl in one polymer but not shown for use (or functionally equivalent) in numerous other materials.

Referring to Example VIII, this example sets forth the comparison of the use of the bis-phenoxy compounds in eight polymer systems but in substantially more detail with particular reference to light stability, flammability and thermal stability. The results disclosed in this Example VIII are similar to those results obtained in Example VII.

EXAMPLE VII

Regarding Formulation Nos. 1 –10 in Table III, a virgin polyacrylonitrile plastic material, (T-61 polymer crumb, a product of American Cyanamid and characterized as a copolymer of 93% by weight acrylonitrile and about 7% by weight methyl methacrylate) is utilized as the base resin in order to prepare 10 formulations (plastic compositions). With the exception of formulation No. 1, the particular bis-phenoxy compound (and the antimony trioxide enhancing agent where indicated) is incorporated into the plastic (which is dried to remove moisture therefrom) by adding both to a Waring blender which contains acetone as a dispersing liquid. The resultant mixture, after blending for 3 minutes, is poured into evaporation dishes and the acetone evaporated, first at room temperature (20°-25° C) for 60 minutes and followed by oven drying at 60° C for one hour.

The percentages by weight of each component utilized in the respective formulations are listed in Table III. Each formulation is discharged from the evaporation dish and is ground into powder. The powder is subjected to compression molding in a Wabash press by placing said powder between two platens, the bottom of which contains four equal size depressions three inches by five inches by one-eighth inch deep. The top platen is then placed over the bottom platen and heat transfer means supplied thereto in order to melt said powder and thus provide solid samples (after cooling) for testing. The temperature and ram pressure utilized are respectively 100° C and 30 tons.

A polypropylene plastic material, (Hercules Profax ®6523 grade of polypropylene) is utilized as the base resin in order to prepare 13 formulations (plastic compositions) — Nos. 11-23 shown in Table III. With the exception of formulation No. 11, the particular bis-phenoxy compound (and the antimony trioxide enhancing agent where indicated) is incorporated into the plastic and solid samples prepared according to the procedure set forth in Example I.

A virgin nylon 6 plastic material, (Zytel ®211, a product of E. I. du Pont de Nemours and Co., Wilmington, Del.) is utilized as the base resin in order to prepare 7 formulations (plastic compositions) — Nos. 24–30 shown in Table III. With the exception of formulation No. 24, the particular bis-phenpoxy compound (and the antimony trioxide enhancing agent where indicated) is incorporated into the plastic and solid samples prepared according to the procedure set forth in Example I.

Regarding Formulation Nos. 31-33 in Table III, a virgin polymethylmethacrylate plastic material, Plexiglas ®V (811) a commercially available product of Rohm and Haas Company, Philadelphia, Pennsylvania and being substantially free of additives, is utilized as the base resin in order to prepare 3 formulations (plastic compositions). With the exception of formulation No. 31, the particular bis-phenoxy compound (and the antimony trioxide enhancing agent where indicated) is incorporated into the plastic and solid samples prepared according to the procedure set forth in Example I.

Referring to Formulation Nos. 34–37 in Table III, an acrylonitrile-butadiene-styrene (ABS) polymer plastic material, Marbon TP-2098, a product of Marbon Division, Borg-Warner Corporation, Washington, West Virginia, and which is a slight process variation of their commercially available "T" grade ABS polymer, is utilized as the base resin in order to prepare four (4) formulations (plastic compositions). These formulations, Nos. 34-37, are prepared in accordance with the procedure described in ASTM D-1897-68.

Portions of the samples of each respective formulation (Nos. 1-37, Table III) prepared respectively according to the above described procedures are then subjected to two different standard flammability tests, i.e. UL 94 and ASTM D-2863-70, i.e. Oxygen Index, O.I.

The results of these flammability tests are shown in Table III.

TABLE III

FLAMMABILITY DATA FOR DIFFERENT PLASTIC COMPOSITIONS CONTAINING BIS-PHENOXY COMPOUNDS WITH AND WITHOUT ENHANCING AGENTS

| FORMULATION NO. | BIS-PHENOXY COMPOUND FORMULA | % | ENHANCING AGENT $Sb_2O_3$, % | OXYGEN INDEX % | UL 94 VALUE |
|---|---|---|---|---|---|
| Polyacrylonitrile Polymer | | | | | |
| 1. | — | 0 | 0 | 22.5 | SB |
| 2. | III | 2 | 0 | 23.5 | SB |
| 3. | III | 5 | 0 | 23.8 | SB |
| 4. | III | 10 | 0 | 24.0 | SB |
| 5. | III | 5 | 5 | 25.3 | SB |
| 6. | III | 5 | 10 | 25.3 | SB |
| 7. | II | 2 | 0 | 23.0 | SB |
| 8. | II | 5 | 0 | 23.0 | SB |
| 9. | II | 10 | 0 | 24.0 | SB |
| 10. | II | 5 | 5 | 25.0 | SB |
| Polypropylene Polymer | | | | | |
| 11. | — | 0 | 0 | 18.0 | Burns |
| 12. | III | 15 | 0 | 20.0 | SB |
| 13. | III | 15 | 5 | 22.8 | SB |
| 14. | III | 20 | 5 | 26.0 | SB |
| 15. | III | 25 | 0 | 24.0 | SB |
| 16. | III | 25 | 5 | 26.0 | SB |
| 17. | II | 15 | 0 | 19.0 | SB |
| 18. | II | 15 | 5 | 22.0 | SB |
| 19. | II | 20 | 5 | 25.0 | SB |
| 20. | II | 25 | 0 | 23.0 | SB |
| 21. | II | 25 | 5 | 25.0 | SB |
| 22. | III | 20 | 10 | 25.0 | SB |
| 23. | II | 20 | 10 | 24.0 | SB |
| Nylon | | | | | |
| 24. | — | 0 | 0 | 23.0 | SB |
| 25. | III | 10 | 0 | 23.5 | SB |
| 26. | III | 10 | 3 | 24.5 | SB |
| 27. | III | 13 | 3 | 27.5 | SE-2 |
| 28. | II | 10 | 0 | 23.5 | SB |
| 29. | II | 10 | 3 | 24.0 | SB |
| 30. | II | 13 | 3 | 27.0 | SE-2 |
| Polymethylmethacrylate Polymer | | | | | |
| 31. | — | 0 | 0 | 18.0 | SB |
| 32. | II | 15 | 0 | 20.5 | SB |
| 33. | II | 15 | 5 | 20.5 | SB |
| Acrylonitrile-Butadiene-Styrene (ABS) Polymer | | | | | |
| 34. | — | 0 | 0 | 19.0 | HB(SB) |
| 35. | II | 15 | 0 | 27.0 | HB(SB) |
| 36. | II | 15 | 5 | 32.5 | V-0(SE-0) |
| 37. | III | 15 | 5 | 35.0 | V-0(SE-0) |

Referring to Table III, the bis-phenoxy compound formula II and III relates to the structural formulae heretofor set forth; and the UL 94 values are on a graduated scale wherein the highest degree to lowest degree of flame retardancy is respectively SE-0 (V-0), SE-1 (V-1), SE-2 (V-2), SB (HB) and Burns.

The results shown in Table III demonstrate the unexpected and completely unpredictable results using different polymer systems, in this instance the unique effectiveness of the plastic composition containing a three component system which consists of the bis-phenoxy compounds, an enhancing agent and acrylonitrile-butadiene-styrene (ABS) polymer as compared to the use of such bis-phenoxy compound with or without an enhancing agent in a polyacrylonitrile polymer, a polymethylmethacrylate polymer, a nylon polymer and a polyolefin such as polypropylene polymer, the latter four of which polymers show substantially no increase in flame retardancy via the use of said bis-phenoxy compounds with or without an enhancing agent.

Regarding the use of an enhancing agent in formulation Nos. 5 and 6, the results obtained therefrom show that there is no increase in flame retardancy. Thus, for example, No. 1 (control) has an UL value of SB and Nos. 5 and 6 (which have different enhancing agent levels, 5% versus 10 %) have also an UL value of SB. In viewing the results of No. 3 (5% – 0%) and No. 5 (5% – 5%), it can be seen that even the use of the enhancing agent does not increase flame retardancy in a polyacrylonitrile polymer.

With reference to the polypropylene polymer compositions Nos. 11 thru 23, it can readily be seen from the UL 94 values that the incorporation of the particular bis-phenoxy compound therein resulted in substantially little, if any, increase in flame retardancy as compared to the control, considering the experimental accuracy. Even the use of an enhancing agent did not result in an increase in flame retardancy, note No. 12-SB and No. 13-SB. Predicated upon this data, it is thus seen that the incorporation of the bis-phenoxy compounds (with or without an enhancing agent) in a polypropylene results in no flame retardant efficacy.

Specifically referring to the nylon polymer compositions Nos. 24–30, formulation No. 24 (the control) had an UL value of SB. In Nos. 25 and 28, the use of the particular bis-phenoxy compound results in no increase in flame retardancy via incorporation of 10% (SB versus SB) of the bis-phenoxy compound per se.

Regarding the use of an enhancing agent in formulation Nos. 26, 27, 29 and 30, the results obtained therefrom show there is substantially little, if any, increase in flame retardancy. Thus, for example, No. 1 (control) has an UL value of SB and Nos. 26 and 29 also have an UL value of SB. While Nos. 27 and 30 each have an UL value of SE-2, this is not considered a significant increase and thus even the use of the enhancing agent does not result in flame retardancy efficacy.

With reference to the polymethylmethacrylate polymer compositions Nos. 31, 32 and 33, it can readily be seen from the UL values, i.e. all SB, that the incorporation of the particular bis-phenoxy compound therein results in no increase in flame retardancy as compared to the control. Even the use of an enhancing agent did not result in an increase in flame retardancy. Consequently, it can readily be seen that the incorporation of the bis-phenoxy compounds in a polymethylmethacrylate results in no flame retardant efficacy.

The most unexpected results in flame retardancy were obtained via the incorporation of the particular bis-phenoxy compounds and enhancing agents in an acrylonitrile-butadiene-styrene (ABS) polymer. Referring specifically to formulation Nos. 34 and 37, the control, formulation No. 34, had an UL value of HB (SB). Notwithstanding the incorporation of 15% (No. 35) of the particular bis-phenoxy compound per se in the ABS polymer, there still results an UL value of SB. Use of the enhancing agent with both bis-phenoxy compounds formulae II and III, in formulation Nos. 36 and 37 results in an unexpected UL value change from SB (No. 35) to SE-0 (No. 36) and SE-0 (No. 37). In view of these results, it was quite unexpected that the ABS polymer system, having incorporated therein the particular bis-phenoxy compounds and enhancing agent would show such superior flame retardant efficacy based on the results obtained from the performance of the other four (4) polymers, i.e. polyacrylonitrile, polypropylene, nylon and polymethylmethacrylate polymer systems having the same bis-phenoxy compounds and enhancing agents incorporated therein. Consequently, it can readily be seen that it is not possible to predict the efficacy and/or functionality of any halogen-containing material (which may be suggested as a flame retardant) in any polymeric system until one actually conducts a substantial research program thereon and ascertains properties of the "flame retarded" system and its utility.

EXAMPLE VIII

Solid samples of eight different plastic compositions separately containing certain prior art compounds and the herein described bis-phenoxy compound, both with or without the herein described enhancing agents, are prepared according to the above described ABS procedure of Example VII, except that the specimens are injection molded instead, rather than compression molded, and are subjected to the following tests in order to ascertain comparative properties of the resultant plastic compositions:

| (1) | Flammability | |
| --- | --- | --- |
| | (a) Oxygen Index, O.I. | ASTM Test No. D-2863-70 |
| | (b) UL-94 | UL-94 Procedure described herein and dated February 1, 1974. |
| (2) | Light Stability (Weather Ometer) | |
| | (a) Visual rank (1 is the highest) | Procedure described herein and in Example V, except that the light source is the Xenon arc rather than a carbon arc. |
| | (b) Gardner Colorimeter ("ΔE" Values) | |
| (3) | Initial Color | Visual color observation immediately after injection molding. |
| (4) | Visual Migration | Visual observation of surface haze presence |
| (5) | TGA and Isotherm | Procedure described in Example VI. |
| (6) | Melt Flow | ASTM Test No. 1238-70. |
| (7) | Notched Izod Impact | ASTM Test D256-72a; and |
| (8) | Heat Distortion | |

| | |
| --- | --- |
| Temperature (HDT) | ASTM Test No. D648-72. |

Regarding item (2) above, i.e. light stability, the results obtained via the "Visual" rank include any color changes which occurred in the molded materials tested from a combination of processing and exposure to the xenon arc.

Each of the aforementioned Tests are standard tests in the art and are utilized collectively in order to ascertain the efficacy of a polymeric system as an overall flame retardant composition for commercial application. All of these tests are to be considered as incorporated herein by reference.

The different polymers utilized along with trade names and corresponding suppliers are listed below.

| Polymer | Trademark | Supplier |
| --- | --- | --- |
| ABS | Cycolac T-2098 | Borg-Warner |
| Polystyrene (high impact) HIPS | Bakelite TMDE-6500 | Union Carbide |
| Polycarbonate | Lexan 141 | General Electric |
| Nylon 6 | Zytel 211 | DuPont |
| Polypropylene | Profax 6523 | Hercules |
| Terephathalate polyester | Valox 310 | General Electric |
| Polyphenylene oxide, modified (PPO) | Noryl 731 | General Electric |
| Polyethylene, Low Density (LDPE) | Bakelite DPD-3900 | Union Carbide |

The concentration of the additives (i.e. prior art compounds—designated PAC—or certain bis-phenoxy compounds—designated BPC—with or without an enhancing agent—designated EA—and the respective Table Nos. listing the pertinent data are shown below. The Table numbers are shown in parenthesis.

| Polymer | PAC or BPC/EA --$Sb_2O_3$% | PAC or BPC ONLY |
| --- | --- | --- |
| ABS | 15/5(IV) | 20/0(V) + 30/0(VI) |
| HIPS | 12/4(VII) | 16/0(VIII) + 30/0(IX) |
| Polycarbonate | 3/1(X) | |
| Nylon | 12/4(XI) | |
| Polypropylene | 12/4(XII) | |
| Polyester | 12/4(XIII) | 16/0 (IV) |
| PPO | 9/3 (XV) | |
| PPO | 9/3 Pigmented $TiO_2$ | (XVI) |
| LDPE | 20/5 (XVII) | |

All percentages (%) shown are on a weight basis, based on the total weight of the plastic composition.

The identification of the prior art compounds (PAC) listed as A,B,C,D,E and F in the Tables are shown below:

| PAC (Letter) | FORMULA |
| --- | --- |
| A | $C_6Cl_5C_6Cl_5$ decachlorobiphenyl |
| B | $C_6Br_5OC_6Br_5$ Bis-(pentabromophenyl)ether |
| C | $C_6Br_6$ Hexabromobenzene |
| D | $C_6Br_5CH_2Br$ Pentabromobenzyl bromide |
| E | $C_6H_2Br_2(OCH_3)C(CH_3)_2C_6H_2Br_2(OCH_3)$ Bis-2,2-(3,5-dibromo-4-methoxyphenyl)propane |
| F | $C_6H_2Br_3OCH_2CBr=CBrCH_2OC_6H_2Br_3$ Trans 1,4-Bis(2,4,6-tribromophenoxy)-2,3-dibromo-2-butene |

The certain bis-phenoxy compounds (BPC) listed in the Tables under Present Invention, as II, III, VI, etc.

correspond to those compounds listed on pages 11 and 12 of this specification.

The control (base resin) is the particular designated polymer without the PAC, BPC or EA.

The results of this comparative testing are set forth in Tables IV through XVII.

Table IV

| Resin ABS Additive 15/5 | Control (Base) Resin | Prior Art Compounds | | | | | | Present Invention Compounds | | | | | |
|---|---|---|---|---|---|---|---|---|---|---|---|---|---|
| | | A | B | C | D | E | F | II | III | VI | IV | VIII | IX |
| Oxygen Index, % at 73° F | 18.5 | 21.5 | 28.0 | 27.5 | 35.0 | 26.0 | 34.5 | 30.5 | 28.0 | 30.5 | 31.0 | 36.0 | 30.0 |
| UL-94 ⅛" thickness | HB | HB | V-0 | V-0 | V-0 | HB | V-0 | V-0 | V-0 | V-0 | V-0 | V-0 | V-0 |
| Xenon Arc Weather-Ometer (Ranked) | 5 | 6 | 12 | 10 | 13 | 3 | 11 | 7 | 8 | 9 | 2 | 1 | 4 |
| Injection Molded Initial Color | White | Off-White | Off-White | Off-White | Tan | Off-White | Light Cream | White | White | White | White | White | White |
| Visual Migration Initial | | None | None | None | None | None | None | None | None | None | | | |
| 7 Days | | None 266 | None | None 249 | None | None | None | None | None | None | | | |
| TGA 5% wt. loss ° C | 329 | 48 hr. | 307 | 48 hr. | 261 | 271 | 274 | 285 | 290 | 310 | | | |
| Isotherm 72 hr., 150° C | 1.83 | 0.415 | | 0.727 | | | 1.27 | 1.11 | | | | | |
| Melt Flow g/10 min. Conditions "G" 200° C, 5,000g | 3.2 | 3.6 | 4.0 | 4.5 | 8.3 | 9.9 | 4.9 | 8.2 | 6.7 | 3.4 | | | |
| Notched Izod Impact ft. lbs/in. ½ × ⅛ | 3.27 | 1.62 | 1.40 | 1.19 | 1.56 | 1.62 | 1.23 | 1.93 | 2.12 | 1.19 | 2.08 | 1.92 | 1.32 |
| Heat Deflection Temp. ° F at 264 psi Annealed at 180° F | 192 | 189 | 187 | 190 | 184 | 171 | 185 | 180 | 176 | 190 | | | |
| Concentrate Compounding Temperature, ° F | | 400 | 400 | 400 | 400 | 400 | 400 | 450 | 350 | 400 | 400 | 400 | 400 |
| Injection Molding Temperature, ° F | 450 | 450 | 450 | 450 | 450 | 450 | 430 | 450 | 450 | 450 | 450 | 450 | 450 |
| Gardner Color Value, ΔE After 100 hours, Xenon Arc | 6.5 | 3.9 | 20.1 | 11.9 | 12.7 | 4.6 | 8.6 | 6.7 | 7.9 | 7.3 | 0.9 | 4.1 | 1.1 |

Table V

| Resin ABS Additive 20/0 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 18.5 | 20.5 | 24.5 | 24.0 | 27.0 | 22.5 | | 24.0 | 22.5 | | 27.0 | | |
| UL-94 ⅛" thickness | HB | HB | HB | V-0 | V-0 | HB | | HB | HB | | V-0 | | |
| Xenon Arc Weather-Ometer (Ranked) | 1 | 5 7 | 6 | 8 | 1 | | 2 | 3 | | 4 | | | |
| Injection Molded Initial Color | White | Off-White | Off-White | Off-White | Tan | White | Decomposed | White | White | | Off-White | | |
| Visual Migration Initial 7 days | | None | None | None | None | None | | None | None | | None | | |
| TGA 5% wt. loss ° C | | | | | | | | | | | | | |
| Isotherm 72 hr., 150° C | | | | | | | | | | | | | |
| Melt Flow g/10 min. Conditions "G" 200° C, 5,000g | | | | | | | | | | | | | |
| Notched Izod Impact ft. lbs/in. ½ × ⅛ | 3.27 | 1.40 | 1.43 | 1.17 | 1.15 | 1.97 | | 3.27 | 4.18 | | 1.45 | | |
| Heat Deflection Temp. ° F at 264 psi, Annealed at 180° F | | | | | | | | | | | | | |
| Concentrate Compounding Temperature, ° F | | 400 | 400 | 400 | 400 | 400 | 400 | 400 | 400 | | 400 | | |
| Injection Molding Temperature, ° F | 450 | 450 | 450 | 450 | 420 | 450 | | 450 | 450 | | 450 | | |
| Gardner Color Value, ΔE After 100 hours, Xenon Arc | 6.5 | 8.0 | 19.8 | 11.1 | 8.5 | 4.6 | | 4.4 | 5.2 | | 5.6 | | |

Table VI

| Resin ABS Additive 30/0 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 18.5 | 21.5 | 30.0 | 30.0 | 32.0 | 27.0 | 30.0 | 33.5 | 34.0 | | 35.5 | | |
| UL-94 ⅛" thickness | HB | HB | V-0 | V-0 | V-0 | V-0 | V-0 | V-0 | V-0 | | V-0 | | |
| Xenon Arc Weather-Ometer (Ranked) | 3 | 5 | 10 | 8 | 11 | 1 | 7 | 4 | 2 | | 6 | | |
| Injection Molded Initial Color | White | Egg Shell White | Egg Shell White | Egg Shell White | Light Brown | White | Light Tan | White | White | | Egg Shell White | | |
| Visual Migration Initial 7 days | | | | | | | | | | | | | |
| TGA 5% wt. loss ° C | | | | | | | | | | | | | |
| Isotherm 72 hr., 150° C | | | | | | | | | | | | | |
| Melt Flow g/10 min. Conditions "G" 200° C, 5,000g | | | | | | | | | | | | | |
| Notched Izod Impact ft. lbs/in. ½ × ⅛ | 3.27 | 1.06 | 1.08 | 1.09 | 1.50 | 1.42 | 1.19 | 2.49 | 3.65 | | 1.13 | | |
| Heat Deflection Temp. ° F at 264 psi, Annealed at 180° F | | | | | | | | | | | | | |
| Concentrate Compounding Temperature, ° F | — | 440 | 440 | 440 | 392 | 392 | 356 | 440 | 400 | | 440 | | |
| Injection Molding Temperature, ° F | 450 | 450 | 450 | 450 | 400 | 430 | 400 | 450 | 450 | | 450 | | |
| Gardner Color Value, Δ E After 100 hours, Xenon Arc | 6.5 | 1.4 | 9.0 | 2.6 | 6.5 | 1.6 | 2.5 | 2.6 | 1.2 | | 0.8 | | |

Table VII

| Resin HIPS Additive 12/4 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 18.5 | 20.0 | 26.0 | 23.5 | 27.0 | 23.0 | 25.0 | 21.0 | 23.0 | | 25.5 | 26.5 | 26.0 |
| UL-94 ⅛" thickness | HB | HB | V-0 | V-0 | V-0 | HB | V-2 | HB | HB | | V-0 | V-0 | HB |
| Xenon Arc Weather-Ometer (Ranked) | 1 | 5 | 11 | 10 | 12 | 3 | 9 | 4 | 6 | | 8 | 2 | 7 |
| Injection Molded Initial Color | White | Light Cream | Cream | Grey Cream | Light Cream | White | Tan | Off-White | Off-White | | Off-White | Off-White | Off-White |
| Visual Migration Initial | None | None | Perhaps Slight | Perhaps Slight | None | Perhaps Slight | None | None | None | | None | | |
| 7 days | None | None | None | None | None | None | None | None | None | | None | | |
| TGA 5% wt. loss ° C | 322 | 270 | 325 | 263 | 254 | 279 | 277 | 304 | 305 | | 325 | | |
| Isotherm 48 hr., 150° C | 0.582 0.410 | 1.44 | 0.301 | 1.04 | 3.12 | 1.17 | 0.885 | 0.940 | 0.758 | | 0.22 | | |
| Melt Flow g/10 min. Conditions "G" 200° C, 5,000g | 6.2 | 11.0 | 8.8 | 10.4 | 13.3 | 11.1 | 15.8 | 10.7 | 13.8 | | 7.1 | | |
| Notched Izod Impact ft. lbs/in. ½ × ⅛ | 2.12 | 1.61 | 1.71 | 1.66 | 1.65 | 1.64 | 1.25 | 1.76 | 1.63 | | 1.69 | 1.73 | 1.72 |
| Heat Deflection Temp. ° F at 264 psi, Annealed at 160° F | 182 | 171 | 180 | 171 | 165 | 157 | 172 | 172 | 157 | | 177 | | |
| Concentrate Compounding Temperature, ° F | — | 400 | 400 | 400 | 400 | 400 | 400 | 450 | 400 | | 400 | 400 | 400 |
| Injection Molding Temperature, ° F | 450 | 450 | 450 | 450 | 450 | 430 | 430 | 450 | 430 | | 450 | 450 | 450 |
| Gardner Color Value, Δ E After 24 hours, Xenon Arc | 0.7 | 17.6 | 33.6 | 23.9 | 34.3 | 7.0 | 11.0 | 11.0 | 20.9 | | 14.4 | 4.3 | 16.3 |

Table VIII

| Resin HIPS Additive 16/0 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % | | | | | | | | | | | | | |

Table VIII-continued

| Resin HIPS Additive 16/0 | Control (Base Resin) | Prior Art Compounds | | | | | | Present Invention Compounds | | | | | |
| --- | --- | --- | --- | --- | --- | --- | --- | --- | --- | --- | --- | --- | --- |
| | | A | B | C | D | E | F | II | III | IV | VI | VIII | IX |
| at 73° F | 18.5 | 18.5 | 22.0 | 22.0 | | 21.5 | | 21.0 | 21.5 | | 22.0 | | |
| UL-94 ⅛" thickness | HB | HB | V-2 | HB | | HB | | HB | HB | | HB | | |
| Xenon Arc Weather-Ometer (Ranked) | 1 | 2 | 9 | 7 | | 5 | | 3 | 6 | | 4 | | |
| Injection Molded Initial Color | White | off-White | Cream | Cream | Decomposition | White | Decomposition | Off-White | White | | Cream | | |
| Visual Migration Initial | | None | None | None | | None | | None | None | | None | | |
| 7 days | | None | None | None | | None | | None | None | | None | | |
| TGA 5% wt. loss °C | | | | | | | | | | | | | |
| Isotherm 72 hr. 150° C | | | | | | | | | | | | | |
| Melt Flow g/10 min. Conditions "G" 200 C 5000g | | | | | | | | | | | | | |
| Notched Izod Impact ft. lbs/in. ½ × ⅛ | 2.12 | 1.64 | 1.69 | 1.58 | | 1.59 | | 1.62 | 1.60 | | 1.66 | | |
| Heat Deflection Temp. °F at 264 psi, Annealed at 180° F | | | | | | | | | | | | | |
| Concentrate Compounding Temperature, °F | | 400 | 400 | 400 | | 400 | | 400 | 400 | | 400 | | |
| Injection Molding Temperature, °F | 450 | 450 | 450 | 450 | | 450 | | 450 | 450 | | 450 | | |
| Gardner Color Value, ΔE After 24 hours, Xenon Arc | 0.7 | 19.4 | 25.9 | 23.2 | | 21.7 | | 34.0 | 30.5 | | 17.8 | | |

Table IX

| Resin HIPS Additive 30/0 | Control (Base Resin) | Prior Art Compounds | | | | | | Present Invention Compounds | | | | | |
| --- | --- | --- | --- | --- | --- | --- | --- | --- | --- | --- | --- | --- | --- |
| | | A | B | C | D | E | F | II | III | IV | VI | VIII | IX |
| Oxygen Index, % at 73° F | 18.5 | 21.0 | 25.5 | 25.5 | 30.0 | 25.0 | 27.0 | 27.0 | 25.0 | | 32.0 | | |
| UL-94 ⅛" thickness | HB | HB | V-0 | V-0 | V-0 | V-0 | V-0 | V-0 | V-0 | | V-0 | | |
| Xenon Arc Weather-Ometer (Ranked) | 1 | 5 | 10 | 7 | 9 | 2 | 8 | 4 | 6 | | 3 | | |
| Injection Molded Initial Color | Translucent | Biege | Light Grey | Grey | Brown | Light Tan | Tan | off-White | Off-White | | Light Biege | | |
| Visual Migration Initial | | | | | | | | | | | | | |
| 7 days | | | | | | | | | | | | | |
| TGA 5% wt. loss °C | | | | | | | | | | | | | |
| Isotherm 72 hr., 150° C | | | | | | | | | | | | | |
| Melt Flow g/10 min. Conditions "G" 200° C, 5,000g | | | | | | | | | | | | | |
| Notched Izod Impact ft. lbs/in. ½ × ⅛ | 2.12 | 1.10 | 1.21 | 1.43 | 1.45 | 1.27 | 1.11 | 1.39 | 1.35 | | R 1.08 1.10 | | |
| Heat Deflection Temp. °F at 264 psi, Annealed at 180° F | | | | | | | | | | | | | |
| Concentrate Compounding Temperature, °F | | 450 | 450 | 430 | 356 | 392 | 356 | 450 | 400 | | 450 | | |
| Injection Molding Temperature, °F | 450 | 430 | 430 | 410 | 380 | 400 | 380 | 430 | 410 | 430 | | | |
| Gardner Color Value, ΔE After 24 hours, Xenon Arc | 0.7 | 22.4 | 29.7 | 15.8 | 10.4 | 5.1 | 12.1 | 17.2 | 24.9 | | 6.8 | | |

Table X

| Resin Polycarbonate Additive 3/1 | Control (Base Resin) | Prior Art Compounds | | | | | | Present Invention Compounds | | | | |
| --- | --- | --- | --- | --- | --- | --- | --- | --- | --- | --- | --- | --- |
| | | A | B | C | D | E | F | II | III | IV | VIII | IX |
| Oxygen Index, % at 73° F | 25.0 | 36.5 | 41.5 | 39.5 | 39.5 | 37.0 | | 36.5 | 37.5 | 40.0 | | |
| UL-94 ⅛" thickness | HB | V-2 | V-0 | V-2 | V-2 | V-0 | | V-0 | V-0 | V-0 | | |
| Xenon Arc | | | | | | | | | | | | |

Table X-continued

| Resin Polycarbonate Additive 3/1 | Control (Base Resin) | Prior Art Compounds | | | | | | Present Invention Compounds | | | | |
|---|---|---|---|---|---|---|---|---|---|---|---|---|
| | | A | B | C | D | E | F | II | III | IV | VIII | IX |
| Weather-Ometer (Ranked) | 1 | 5 | 10 | 8 | 9 | 3 | | 2 | 4 | 7 | | |
| Injection Molded Initial Color | Clear | Light Cream Perhaps | Light Cream | Light Cream | Cream | Light Cream | Decomposition | Off-White Perhaps | Cream | Off-White | | |
| Visual Migration Initial | | Slight | None | None | None | None | | Slight | None | None | | |
| 7 days | | None | None | None | None | None | | None | None | None | | |
| TGA 50% wt. loss ° C | 427 | 381 | 379 | 375 | 366 | 378 | | 398 | 374 | 388 | | |
| Isotherm 24 hr. 200° C | 0.394 | 1.20 | 0.529 | 1.78 | 1.18 | 1.12 | | 0.664 | 0.655 | 0.326 | | |
| Melt Flow g/10 min. Conditions "G" 275° C, 1,200g | 9.8 | 11.8 | 12.7 | 18.8 | 17.2 | 16.8 | | 8.8 | 17.4 | 11.4 | | |
| Notched Izod Impact ft. lbs/in. ½ × ⅛ | 16.50 | 6.64 | 8.54 | 2.73 | 1.02 | 3.16 | | 16.98 | 7.25 | 9.41 | | |
| Heat Deflection Temp. ° F at 264 psi, Annealed at 200° F | 279 | 265 | 267 | 260 | 259 | 262 | | 265 | 259 | 268 | | |
| Concentrate Compounding Temperature, ° F | | 500 | 480 | 480 | 500 | 500 | Degraded at 500 | 500 | 500 | 500 | | |
| Injection Molding Temperature, ° F | 520 | 520 | 520 | 520 | 520 | 520 | | 520 | 520 | 520 | | |
| Gardner Color Value, ΔE After 48 hours, Xenon Arc | 1.1 | 4.7 | 22.2 | 10.1 | 6.7 | 3.8 | | 3.6 | 3.6 | 9.6 | | |

Table XI

| Resin Nylon 6 Additive 12/4 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 21.5 | 26.0 | 28.5 | 29.0 | | | | 24.5 | | | 27.5 | | |
| UL-94 ⅛" thickness | HB | V-2 | V-0 | V-2 | | | | V-2 | Molding Problems Decomposed | | V-0 | | |
| Xenon Arc Weather-Ometer (Ranked) | | | | | Did Not Mold | Decomposed | Did Not Mold | | | | | | |
| Injection Molded Initial Color | Natural (white) | Cream | Cream | Cream | | | | Off-White | | | Cream | | |
| Visual Migration Initial | | None | None | None | | | | None | | | None | | |
| 7 days | | None | None | None | | | | None | | | None | | |
| TGA 5% wt. loss ° C | 237 | 219 | 219 | 204 | | | | 214 | | | 220 | | |
| Isotherm 48 hr. 150° C | 5.67 | 4.70 | 4.60 / 4.76 | | | | 4.49 | | 4.97 | | | | |
| Melt Flow g/10 min. Conditions "G" 100° C 5000g | | | | | | | | | | | | | |
| Notched Izod Impact ft. lbs/in. ½ × ⅛ | 3.09 | 1.85 | 1.66 | 1.60 | | | | 2.54 | | | 2.20 | | |
| Heat Deflection Temp. ° F at 264 psi, Annealed at 100° F | 125 | 137 | 133 | 135 | | | | 132 | | | 136 | | |
| Concentrate Compounding Temperature, ° F | | 440 | 440 | 440 | | 440 | | 440 | | | 440 | | |
| Injection Molding Temperature, ° F | 480 | 480 | 480 | 480 | | 450 | | 480 | | | 480 | | |
| Gardner Color Value, Δ E After 100 hours, Xenon Arc | 0.9 | 2.0 | 3.7 | 2.5 | | | | 2.4 | | | 7.9 | | |

Table XII

| Resin Polypropylene Additive 12/4 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 17.5 | 21.0 | 24.0 | 25.0 | 24.0 | 20.5 | 31.5 | 21.5 | 23.5 | | 23.0 | | |
| UL-94 ⅛" thickness | HB | HB | V-2 | HB | V-2 | HB | V-0 | HB | V-2 | | HB | | |
| Xenon Arc | | | | | | | | | | | | | |

Table XII-continued

| Resin Polypropylene Additive 12/4 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Weather-Ometer (Ranked) | 1 | 4 | 11 | 9 | 10 | 5 | 8 | 3 | 2 | | 6 | | |
| Injection Molded Initial Color | Clear | Off-White | Off-White | Cream | Cream | Off-White | Cream | Off-White | Off-White | | Off-White | | |
| Visual Migration Initial | | Perhaps Slight | Perhaps Slight | None | None | Perhaps Slight | | Perhaps Slight | Perhaps Slight | | None | | |
| 7 days | | Perhaps Slight | None | None | None | None | | Perhaps Slight | Perhaps Slight | | None | | |
| TGA 5% wt. loss °C | 272 | 264 | 274 | 256 | 252 | 260 | 269 | 275 | 273 | | 276 | | |
| Isotherm 48 hr. 150° C | 0.00 0.20 | 0.937 | 0.493 | 3.7 | 13.6 | 2.14 | 0.756 | 0.607 | 0.873 | | 0.33 | | |
| Melt Flow g/10 min. Conditions "L", 230° C, 2,160g | 5.2 | 9.3 | 6.8 | 9.8 | 9.3 | 9.9 | 17.7 | 10.4 | 8.9 | | 6.4 | | |
| Notched Izod Impact ft. lbs/in. ¼ × ¼ | 1.22 | 1.19 | 1.21 | 1.12 | 1.16 | 1.13 | 1.10 | 0.96 | 1.07 | | 1.20 | | |
| Heat Deflection Temp. °F at 66 psi, Annealed at 194° F | 246 | 253 | 240 | 276 | 240 | 235 | 267 | 267 | 257 | | 277 | | |
| Concentrate Compounding Temperature, °F | | 400 | 420 | 400 | 360 | 450 | 420 | 400 | 400 | | 400 | | |
| Injection Molding Temperature, °F | 440 | 440 | 440 | 440 | 440 | 440 | 400 | 440 | 440 | | 440 | | |
| Gardner Color Value, ΔE After 48 hours, Xenon Arc | 0.5 | 5.3 | 12.8 | 10.0 | 8.8 | 5.6 | 7.3 | 2.7 | 2.7 | | 4.8 | | |

Table XIII

| Resin Polyester Additive 12/4 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 22.0 | 28.0 | 32.0 | 32.0 | 32.0 | 26.0 | | 30.0 | 29.0 | | 32.0 | | |
| UL-94 ¼" thickness | HB | V-2 | V-0 | V-0 | V-0 | V-2 | | V-2 | V-2 | | V-0 | | |
| Xenon Arc Weather-Ometer (Ranked) | 1 | 5 | 9 | 7 | 8 | | | 3 | 2 | | 4 | | |
| Injection Molded Initial Color | White | Off-White | Off-White | Off-White | Cream | Cream | Decomposition | White | White | | Cream | | |
| Visual Migration Initial | | None | None | None | None | None | | None | None | | None | | |
| 7 days | | None | None | None | None | None | | None | None | | None | | |
| TGA 5% wt. loss °C | 369 | 281 | 346 | 266 | 292 | 305 | | 311 | 330 | | 351 | | |
| Isotherm 24 hr. 200° C | 0.576 0.489 | 1.97 | 0.115 | 3.66 | 4.67 | 2.89 | | 1.99 | 0.606 | | 0.446 | | |
| Melt Flow g/10 min. Conditions "H" 230° C, 1,260g | 15.0 | 11.5 | 12.8 | 10.8 | 22.0 | 16.5 | | 6.5 | 25.8 | | 11.3 | | |
| Notched Izod Impact ft. lbs/in. ¼ × ¼ | 1.51 | 1.04 | 1.00 | 1.07 | 0.96 | 1.12 | | 1.19 | 1.33 | | 0.90 | | |
| Heat Deflection Temp. °F at 264 psi Annealed at 100° F | 123 | 122 | 127 | 127 | 121 | 123 | | 117 | 122 | | 139 | | |
| Concentrate Compounding Temperature, °F | | 450 | 450 | 450 | 450 | 450 | | 450 | 450 | | 450 | | |
| Injection MOlding Temperature, °F | 470 | 460 | 460 | 460 | 470 | 470 | | 460 | 470 | | 460 | | |
| Gardner Color Value, ΔE After 24 hours, Xenon Arc | 1.9 | 7.8 | 22.6 | 7.3 | 8.5 | 1.9 | | 3.4 | 3.1 | | 4.2 | | |

Table XIV

| Resin Polyester Additive 16/0 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 22.0 | 28.0 | 23.0 | 28.5 | | | | 27.5 | 27.5 | | 27.5 | | |
| UL-94 ¼" thickness | HB | V-2 | V-2 | V-2 | | | | V-2 | V-2 | | V-2 | | |
| Xenon Arc | | | | | | | | | | | | | |

Table XIV-continued

| Resin Polyester Additive 16/0 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Weather-Ometer (Ranked) | | | | | | | | | | | | | |
| Injection Molded Initial Color | White | Off-White | Light Tan | Light Grey | | | | Off-White | White | | White | | |
| Visual Migration Initial | | | | | | | | | | | | | |
| 7 days | | | | | | | | | | | | | |
| TGA 50% wt. loss °C | | | | | | | | | | | | | |
| Isotherm 24 hr., 200° C | | | | | | | | | | | | | |
| Melt Flow g/10 min. Conditions "H", 230° C, 1,260g | | | | | | | | | | | | | |
| Notched Izod Impact ft. lbs/in. ½ × ⅛ | 1.51 | 0.93 | 1.32 | 1.13 | | | | 1.19 | 1.33 | | 1.13 | | |
| Heat Deflection Temp. °F at 264 psi, Annealed at 100° F | | | | | | | | | | | | | |
| Concentrate Compounding Temperature, °F | | 450 | 450 | 450 | | | | 470 | 470 | | 450 | | |
| Injection Molding Temperature, °F | 470 | 460 | 460 | 460 | | | | 460 | 460 | | 460 | | |
| Gardner Color Value, ΔE After 24 hours, Xenon Arc | | | | | | | | | | | | | |

Table XV

| Resin PPO Additive 9/3 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | V | VIII | IX |
| Oxygen Index, % at 73° F | 26.5 | 25.0 | 30.0 | 28.0 | 31.0 | 27.0 | 30.0 | 27.5 | 29.0 | | 27.0 | | |
| UL-94 ⅛" thickness | V-1 | V-1 | V-0 | V-0 | V-0 | V-0 | V-0 | V-0 | V-0 | | V-0 | | |
| Xenon Arc Weather-Ometer (Ranked) | | | | | | | | | | | | | |
| Injection Molded Initial Color | Brown | Brown | Brown | Brown | Brown | Brown | Brown | Brown | Brown | | Brown | | |
| Visual Migration Initial | | None | None | None | None | Perhaps Slight | None | None | None | | None | | |
| 7 days | | None | None | None | None | None | None | None | None | | None | | |
| TGA 5% wt. loss °C | 281 | 249 | 294 | 244 | 243 | 262 | 261 | 277 | 276 | | 279 | | |
| Isotherm 24 hr. 200° C | 1.87 | 4.07 | 2.21 | 5.00 | 3.88 | 3.19 | 5.40 | 3.08 | 3.19 | | 2.35 | | |
| Melt Flow g/10 min. Conditions | 1.4 | 3.3 | 2.1 | 2.6 | | 3.7 | | 3.8 | 3.0 | | 1.9 | | |
| Notched Izod Impact ft. lbs/in. ½ × ⅛ | 4.02 | 2.39 | 2.44 | 2.44 | 1.94 | 2.97 | 1.77 | 2.50 | 2.60 | | 1.89 | | |
| Heat Deflection Temp. °F at 264 psi, Annealed at 235° F | 209 | 196 | 205 | 200 | 200 | 177 | 194 | 193 | 190 | | 203 | | |
| Concentrate Compounding Temperature, °F | | 450 | 450 | 450 | 450 | 450 | 450 | 450 | 450 | | 450 | | |
| Injection Molding Temperature, °F | 450 | 450 | 450 | 450 | 450 | 450 | 450 | 450 | 450 | | 450 | | |
| Gardner Color Value, ΔE After hours, Xenon Arc | | | | | | | | | | | | | |

Table XVI

| Resin PPO Additive 9/3 (Pigmented) | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 25.0 | | 32.0 | 31.0 | 33.5 | 26.5 | 32.5 | 28.0 | 28.5 | | 30.0 | | |
| UL-94 ⅛" thickness | HB | | V-0 | V-0 | V-0 | V-0 | V-0 | V-0 | V-0 | | V-0 | | |
| Xenon Arc Weather-Ometer (Ranked) | 1 | | 9 | 6 | 8 | 1 | 7 | 3 | 2 | | 4 | | |
| Injection Molded | Light | | Light | Light | | Light | Dark | Light | Light | | Light | | |

Table XVI-continued

| Resin PPO Additive 9/3 (Pigmented) | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Initial Color | Tan | | Tan | Tan | Tan | Tan | Tan | Tan | Tan | | Tan | | |
| Visual Migration | | | | | | | | | | | | | |
| Initial | None | | None | None | None | None | None | None | None | | None | | |
| 7 days | None | | None | None | None | None | None | None | None | | None | | |
| TGA 5% wt. loss °C | 389 | | 335 | 284 | 291 | 311 | 275 | 338 | 324 | | 337 | | |
| Isotherm 24 hr. 200° C | 0.299 | | 0.420 | 0.893 | 0.865 | 0.587 | 1.02 | 0.556 | 0.272 | | 0.476 | | |
| Melt Flow g/10 min. Conditions | | | | | | | | | | | | | |
| Notched Izod Impact ft. lbs/in. ½ × ⅛ | 3.24 | | 2.14 | 2.00 | 1.19 | 2.02 | 1.40 | 2.16 | 2.18 | | 1.82 | | |
| Heat Deflection Temp. °F at 264 psi, Annealed at 200° F | 246 | | 233 | 226 | 227 | 210 | 221 | 210 | 207 | | 237 | | |
| Concentrate Compounding Temperature, °F | 450 | | 450 | 450 | 450 | 450 | 450 | 450 | 450 | | 450 | | |
| Injection Molding Temperature, °F | 460 | | 460 | 460 | 460 | 460 | 460 | 460 | 460 | | 460 | | |
| Gardner Color Value, ΔE After 48 hours, Xenon Arc | 3.6 | | 13.3 | 9.2 | 9.0 | 5.9 | 14.8 | 5.3 | 4.9 | | 6.9 | | |

Table XVII

| Resin LDPE Additive 20/5 | Control (Base Resin) | Prior Art Compounds | | | | | | Present Invention Compounds | | | | | |
|---|---|---|---|---|---|---|---|---|---|---|---|---|---|
| | | A | B | C | D | E | F | II | III | IV | VI | VIII | IX |
| Oxygen Index, % at 73° F | 18.0 | | 28.0 | 29.0 | 27.0 | 26.5 | 26.5 | 26.0 | 28.0 | | 26.5 | | 25.5 |
| UL-94 ⅛" thickness | HB | | V-0 | V-2 | V-2 | V-2 | V-2 | V-2 | V-0 | | V-0 | | V-2 |
| Xenon Arc Weather-Ometer (Ranked) | | | | | | | | | | | | | |
| Injection Molded Initial Color | Natural | | Off-White | Light White | Off-Grey | White White | Cream | White | White | | White | | |
| Visual Migration | | | | | | | | | | | | | |
| Initial | | | None | Yes | Yes | None | None | None | Yes | | None | | |
| 7 days | | | None | Yes | Yes | None | Yes | None | Yes | | None | | |
| TGA 5% wt. loss °C | 302 | | 330 | 248 | 248 | 265 | 267 | 305 | 308 | | 332 | | |
| Isotherm 48 hr. 150° C | 0 | | 0 | 1.84 | 2.42 | 0.78 | 0.66 | 0.26 | 0.41 | | 0.16 | | |
| Melt Flow g/10 min. Conditions "G" 200 C 5000g | | | | | | | | | | | | | |
| Notched Izod Impact ft.-lbs/in. ½ × ⅛ | NB >6.6 | | NB >7.1 | NB >7.9 | 3.31 | NB >7.3 | NB >8.3 | 2.12 | NB >8.8 | | NB >8.1 | | NB |
| Heat Deflection Temp. °F at 264 psi Annealed at 180° F | | | | | | | | | | | | | |
| Concentrate Compounding Temperature, °F | 400 | | 400 | 400 | 400 | 400 | 400 | 450 | 400 | | 400 | | 400 |
| Injection Molding Temperature, °F | 430 | | 450–410 | 410 | 410 | 410 | 410 | 410 | 410 | | 430 | | 410 |
| Gardner Color Value, ΔE After 100 hours, Xenon Arc | 0.4 | | 9.8 | 8.5 | 4.4 | 2.1 | 7.5 | 3.9 | 1.3 | | 3.0 | | 2.4 |

Referring to Tables IV through XVII in general, it is readily apparent that the incorporation of additives in polymer systems is highly unpredictable. Even in the same polymer, "structurally related" prior art compounds and the bis-phenoxy compounds (of the present invention) produced completely different results. For example, Table IV shows the results of testing an ABS polymer containing 15% PAC or BPC and 5% EA. The ABS/BPC/EA combination is the only one which produced V-0 (UL, 94), white color ΔE values substantially the same as the control (without additives) and superior thermal stability. While B, C, D, and F (prior art compounds) yielded a V-0 (UL 94) composition, the ΔE values were excessively high and thus nonapplicable for commercial ABS uses. A and E show non-efficacy (HB ratings like the control) thereof as flame retardants and again point out the non-predictability of additives incorporated in either the same or various polymers. (The inclusion of data, relating to where no enhancing agent is used, is presented to show non-efficacy of BPC at low concentrations and the large quantities required to produce efficacy—note Table V and VI.) Thus, out of all the data shown herein, (Examples I through VIII), it is clear that the combination of the bis-phenoxy compounds and enhancing agent result

UNITED STATES PATENT OFFICE
CERTIFICATE OF CORRECTION

PATENT NO. : 4,058,501
DATED : November 15, 1977
INVENTOR(S) : Arnold L. Anderson It is certified that error appears in the above-identified patent and that said Letters Patent are hereby corrected as shown below:

On the cover (data page) after item /¯73_/ insert:

/¯*_/ Notice: The portion of the term of this patent subsequent to April 5, 1994 has been disclaimed.

Signed and Sealed this

First Day of August 1978

[SEAL]

Attest:

RUTH C. MASON
Attesting Officer

DONALD W. BANNER
Commissioner of Patents and Trademark